Sept. 9, 1969    E. VON WEDEL    3,465,996
UNIVERSAL CONNECTING ARRANGEMENT
Filed April 25, 1967    7 Sheets-Sheet 3
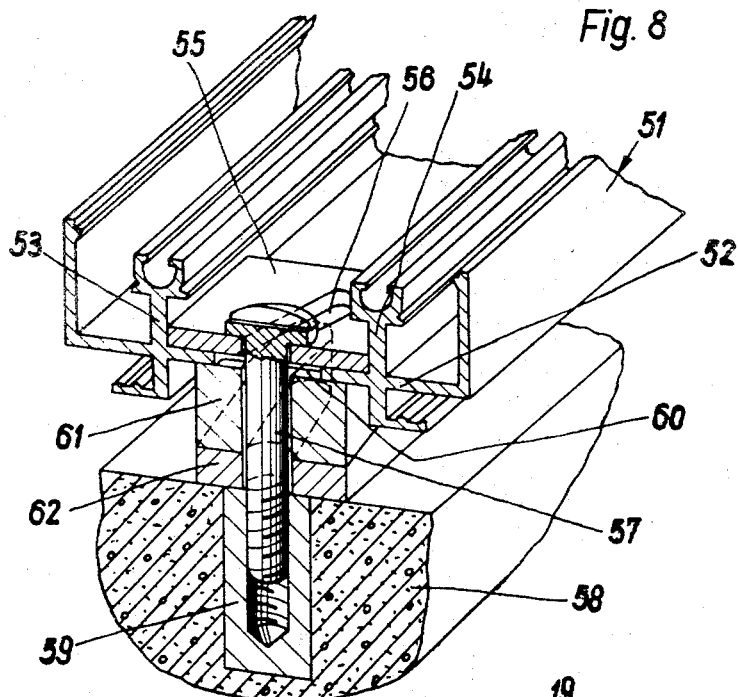
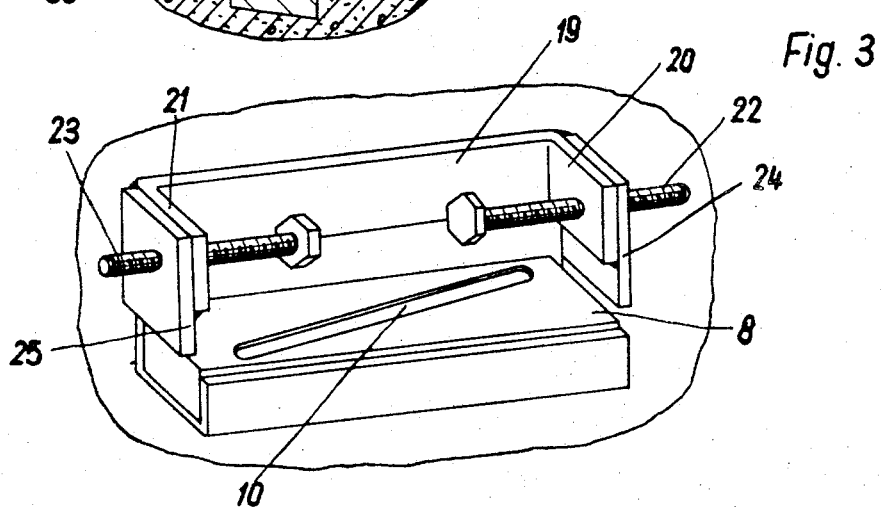
Inventor:
Ernst von Wedel
by Michael S. Striker,
Attorney United States Patent Office 3,465,996
Patented Sept. 9, 1969

3,465,996
UNIVERSAL CONNECTING ARRANGEMENT
Ernst von Wedel, Senne I, near Bielefeld, Germany, assignor to Firma Heinz Schurmann & Co., Bielefeld, Germany
Filed Apr. 25, 1967, Ser. No. 635,312
Claims priority, application Germany, Apr. 30, 1966, Sch 38,920
Int. Cl. A47f 5/00
U.S. Cl. 248—287
6 Claims

ABSTRACT OF THE DISCLOSURE

A universal connecting arrangement for connecting two relatively movable elements to one another. The arrangement comprises a first member which is connectable to one of the elements and a second member which is connectable to the other of the elements. The arrangement further comprises a plurality of relatively movable intermediate members at least one of which cooperates with the first member and at least one other of which cooperates with the second member so as to enable movement of one of the elements in any desired direction relative to the other element and to further enable maintenance of such elements in any selected relative position thereof.

BACKGROUND OF THE INVENTION

The present invention relates generally to connecting arrangements, and more particularly to a universal connecting arrangement. Still more particularly, the present invention relates to a universal connecting arrangement for connecting two elements to one another so that at least one can be moved relative to the other in any desired direction and that the movable element can be maintained in any selected relative position with respect to the other element.

In particular, the present invention is concerned with the connecting and adjusting of face or cover plates on masonry structures in general, and on building walls in particular. The invention also relates, however, to the arrangement and adjustment of other elements than face plates relative to their associated supporting structures. However, for the sake of expediency, the disclosure hereafter will be directed in particular to the arrangement and adjustment of such face plates and in all such instances in which this is mentioned, I desire it to be understood that other adjustment possibilities are also to be encompassed.

It is very common in architecture to cover a basic supporting wall, for instance of concrete or the like, with face or cover plates for reasons of affording the supporting wall protection, for reasons of aesthetics, or for both. These plates, of which a plurality is used on the respective walls, are somehow connected to the wall, usually with some spacing therefrom, and to achieve proper positioning of these plates it is necessary that they be adjustable relative to one another as well as relative to the supporting wall. To my knowledge no arrangement has heretofore become known which would permit the desired wide range of adjusting possibilities for these plates.

SUMMARY OF THE INVENTION

The present invention provides a universal connecting arrangement which affords the wide range of adjustment possibilities desired for the application under discussion.

More particularly, the present invention provides a universal connecting arrangement for connecting two relatively movable elements to one another in such a manner as to enable movement of one of the elements in any desired direction relative to the other and to assure maintenance of such elements in any selected relative position thereof.

The present invention permits movement of the movable element relative to the stationary element in three dimensions, namely parallel to the stationary element in two mutually inclined directions, and movement toward and away from the stationary element in a direction inclined to both of the first-mentioned directions.

With the arrangement according to the present invention it is possible to provide such movements independent of one another, that is, when the movable element carries out a movement in one direction it does not automatically move in either of the other two directions unless this is desired and specifically brought about.

With the arrangement according to the present invention it is possible to provide for such adjustment of the face plates or other movable elements while the same are connected to the basic supporting wall or other supporting element; in other words, no disconnection is required.

In accordance with one feature of my invention I provide a universal connecting arrangement for connecting two relatively movable elements to one another, such arrangement comprising a first member which is connectable to one of the elements and a second member which is connectable to the other of the elements. My arrangement additionally comprises a plurality of relatively movable intermediate members. At least one of these intermediate members cooperates with the first member and at least one other of the intermediate members cooperates with the second member. Thus, my universal connecting arrangement enables movement of one of the elements in any desired direction relative to the other element and further makes it possible to maintain such elements in any selected relative position thereof.

In a particularly advantageous embodiment of my invention that member which is connectable to the stationary one of the elements is a support arranged to hold a member, namely one of the intermediate members, in such a manner that the intermediate member can move parallel to the exposed surface of the wall to which the face that is to be connected, such movement being in horizontal direction. The intermediate member is provided with an elongated slot extending in horizontal direction but inclined away from the surface of the supporting wall. The movable element, namely the face plate which is to be secured to the supporting wall, is provided with an angle bracket having a portion extending outwardly from the rear or concealed face of the face plate and provided with a vertically extending recess which is internally screw threaded. An additional intermediate member in form of a bolt is provided, such bolt having a lower end portion which is not screw threaded and which is received in the slot in the first intermediate member and is movable in the slot in longitudinal direction thereof, and a second end portion which is screw threaded and which extends into the recess of the angle bracket carried by the face plate, the screw threads in the recess and on the second end portion of the bolt meshing so as to provide, in response to rotation of the bolt, vertical movement of the face plate.

Inasmuch as the face plates are relatively large it is advantageous to provide at least two and preferably several of the universal connecting arrangements in accordance with the present invention, and at least two of these arrangements are always located in a horizontally extending row, two or more such rows being disposed one above the other on the rear face of the face plate. If for instance two such rows are provided, then the uppermost row supports the face plate on the wall and in this arrangement it is advantageous that the first end portion of the bolts rest on a supporting surface portion of the intermediate member which is carried by the member secured to the basic supporting wall, whereas in the arrangement of the lower row, the second end portions of the bolts in the respective arrangement does not so contact supporting surface portions since this would lead to undesired friction and make the adjusting movement more difficult.

Evidently, the individual universal connecting arrangements associated with each of the face plates can be adjusted independently of one another, just as the individual movements which can be initiated by each of the arrangements can be carried out independently of one another, and it is therefore possible not only to adjust the respective face plates with reference to one another and to the supporting wall, but also to provide adjustments of each individual face plate within itself, that is to correct warping or the like.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 3 is a perspective view of an auxiliary device for use in conjunction with the novel connecting arrangement shown in FIG. 2;

FIG. 8 is a fragmentary sectional view showing a further embodiment of my novel arrangement suitable for securing a frame to a suporting wall.

DESCRIPTION OF THE PREFERRED EMBODIMENTS

Figure 1:
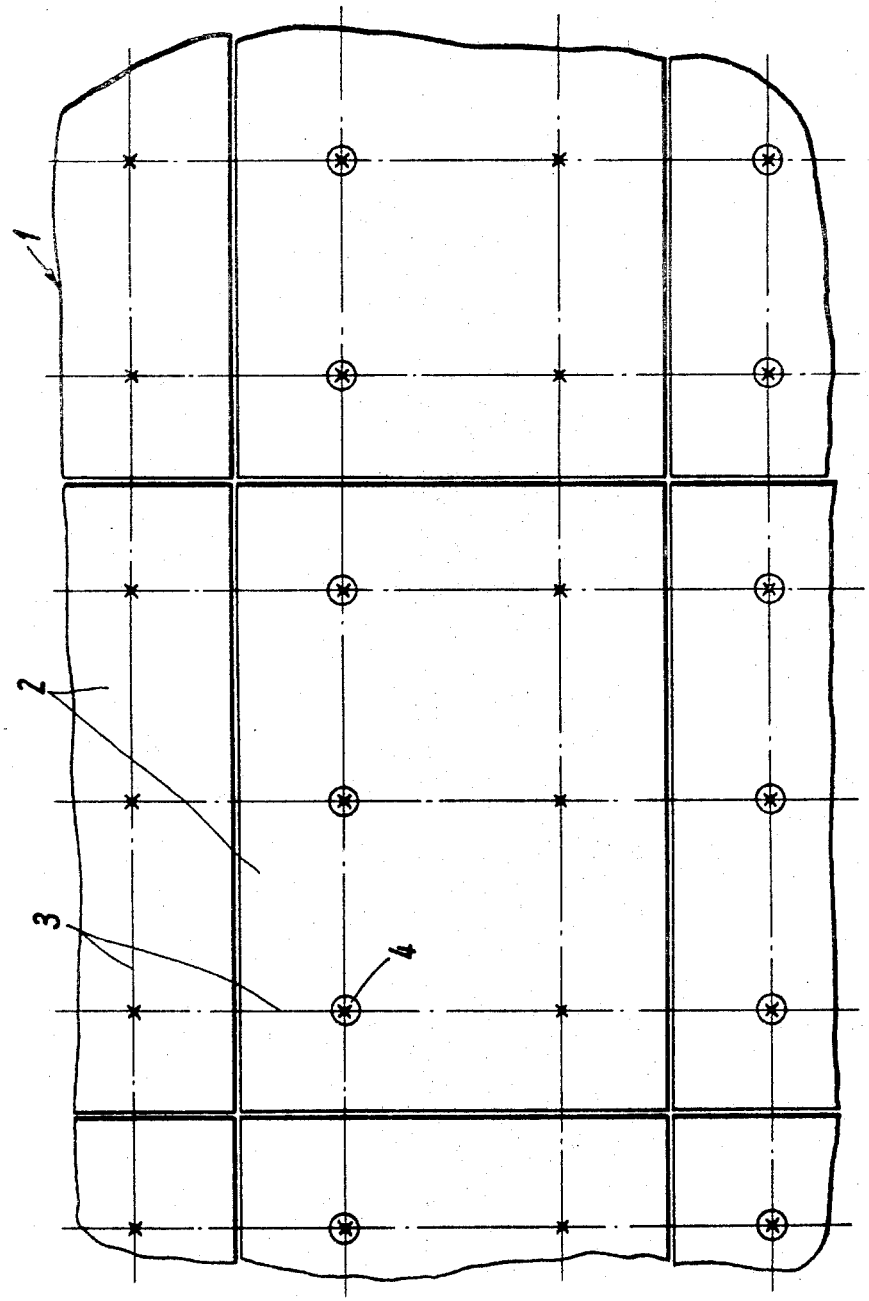
FIG. 1 is a schematic view of a portion of wall provided with face plates.
Figure 2:
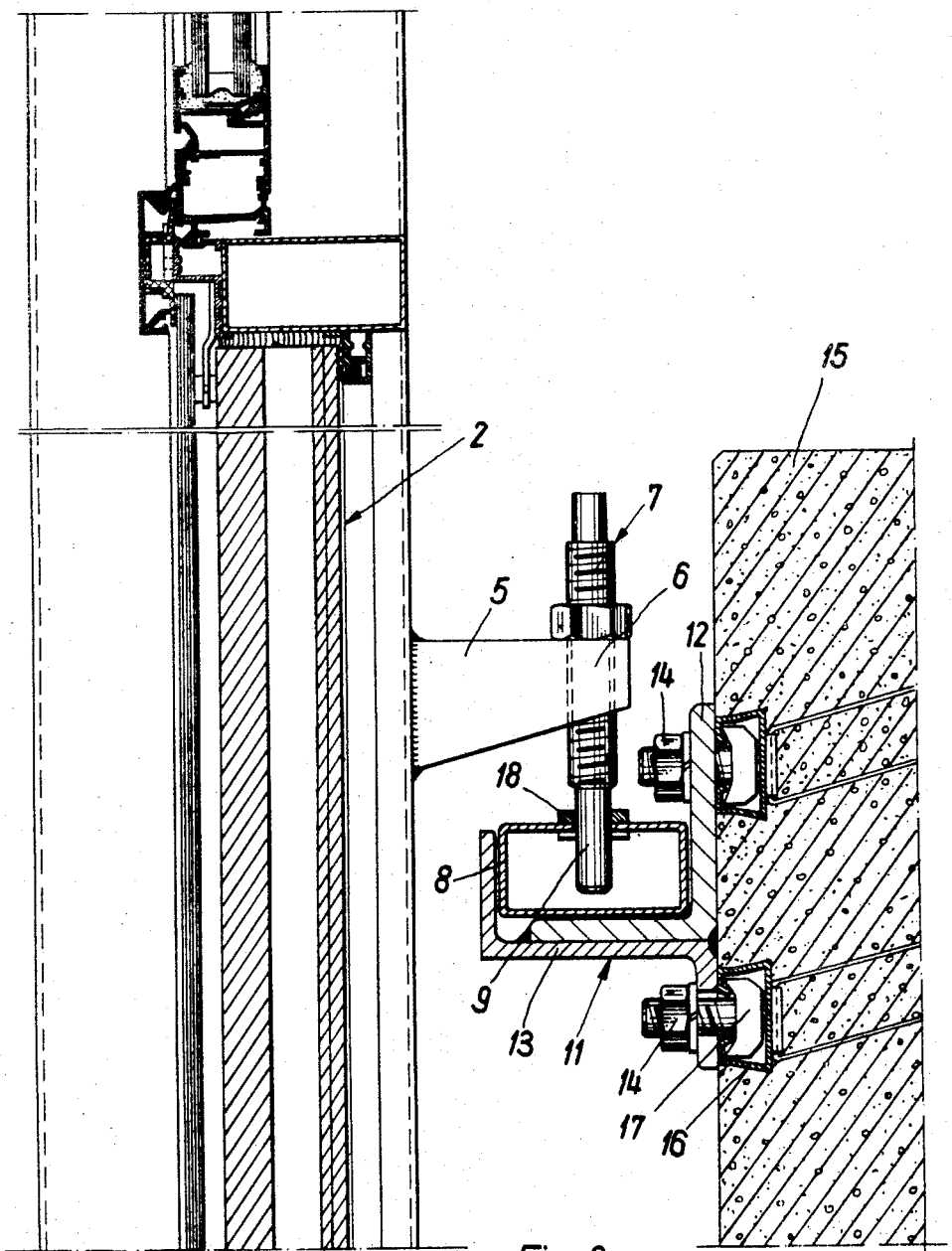
FIG. 2 is a partially sectioned view showing a face plate connected to a supporting wall by means of my novel arrangement.

Discussing now the drawing in detail, and firstly FIG. 1, thereof, it will be seen that there is schematically illustrated an arrangement in which a plurality of face plates 2 are used to construct a cover facade 1 in front of a supporting wall (identified by chain lines 3 and more clearly illustrated at reference numeral 15 in FIG. 2). Each of the plates 2 will be seen to be provided with two rows of my novel universal connecting arrangements, these arrangements being identified with reference numeral 4. The arrangements 4 in the uppermost row are identified with a cross and with a circle surrounding the cross to indicate that in these arrangements the first end portion of the bolt engages and rests on a supporting surface of the auxiliary member on which the longitudinal slot is formed. The arrangements in the lowermost row are not only circled but also identified with a cross and in the arrangements of this row the first end portion of the bolt does not engage the supporting surface in the intermediate member in which the longitudinal slot is provided.

It will be evident from FIG. 1 that adjustment for the plate 2 can be provided at all six points at which one of my universal connecting arrangements is provided. Inasmuch as such adjustment is possible in three dimensions, it is clear that a positioning of the plates 2 relative to one another as well as with respect to the supporting wall 3 is possible with hitherto lacking accuracy.

Coming now to FIG. 2, and to the embodiment shown therein, it is to be noted that the stationary supporting wall is identified with reference numeral 15 whereas the face plate to be adjusted is identified with reference numeral 2. A bracket or projection is identified with reference numeral 5 and extends outwardly from the rearwardly facing face of plate 2, to which latter it is secured as by welding. Bracket 5 is provided with a vertically extending bore or recess which is internally screw-threaded and through which a set screw 7 extends whose one end portion is screw-threaded, as clearly evident, whereas its other lowermost end portion 9 is smooth. The screw thread on the screw 7 meshes with the internal screw thread of the bore 6.

An angle bracket 12 and a Z-shaped bracket 13 are welded to one another, or otherwise secured to one another, and are together secured to the wall 15 via screws whose heads 17 are received in rail or otherwise shaped members 16 embedded in the wall 15, and whose shanks extend outwardly through the bracket 12, 13 and are secured by means of nuts 14.

The brackets 12 and 13 together constitute a support member 11 which defines a longitudinally extending glide way on which rests an intermediate member 8. The particular cross-sectional configuration of this member may be selected at will but in accordance with the present invention and as shown in FIG. 2 it is advantageously of box-shaped cross section and is provided at the uppermost face thereof with a longitudinally extending slot 10 (see FIG. 3) which is inclined to the longitudinal extension of the intermediate member 8. It is into this slot 10 that the smooth end portion 9 of the screw 7 extends and it will be evident that, if the member 8 is moved relative to the support member 11 as well as the screw 7, the plate 2 will be moved in the direction toward or away from the exposed surface of the wall 15 inasmuch as the end portion 9 of screw 7 slides in the longitudinal extending slot 10. If, on the other hand, the screw 7 is made rigid with the member 8, so that it cannot slide in the slot 10, for instance by means of a stop member 18 which is welded or otherwise secured to the intermediate member 8, and if then the intermediate member 8 is moved in longitudinal direction of the support member 11, then the plate 2 is moved parallel to the exposed face of the wall 15. To move the plate 2 again parallel to the exposed face of the wall 15, but in vertical direction rather than in horizontal direction, the screw 7 is turned until the end portion 9 thereof engages the bottom face of the member 8, whereupon the plate 2 will begin to move in vertically upward direction. Of course, to achieve reverse movement, the direction of rotation of the screw 7 is reversed.

To facilitate movement of the plate 2 parallel to the exposed face of the wall 15 in horizontal direction, that is to facilitate shifting of the member 8 in the longitudinal direction of the support member 11, the auxiliary device shown in FIG. 3 may be utilized. As shown in this figure, the auxiliary device consists of a member of generally C-shape or U-shape, identified with reference numeral 19 and provided with two lateral arms 20, 21. The arms 20, 21 are provided with through-going bores through which bolts or screws 22, 23 are threaded in such a manner that the heads of these bolts or screws are located intermediate the arms 20, 21. The member 19 is placed over the member 12 so that the bracket 5 is positioned between the heads of the screws 22, 23. Reinforcing members 24 and 25 are respectively welded or otherwise secured to the arms 20, 21 and are so arranged that they engage the upper portions of the lateral ends of the member 12. They extend downwardly only so far, as clearly shown in FIG. 3, that they will not interfere with, or come in contact with the member 8 and it will be seen that, when the screws or bolts 22, 23 are rotated in such a manner that the head of the respective screw or bolt engages the member 5, pressure is exerted against the latter and the plate 2 is thereby shifted in longitudinal direction of the support member 11.

Figure 4:
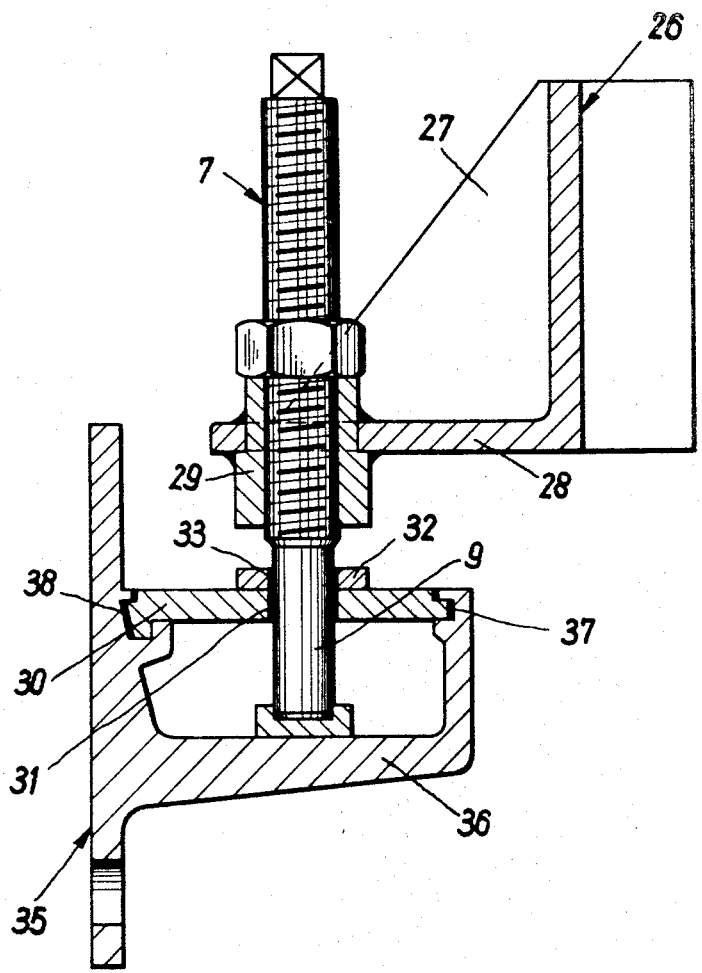
FIG. 4 is a sectional elevation of a modified embodiment of my novel connecting arrangement.
Figure 5:
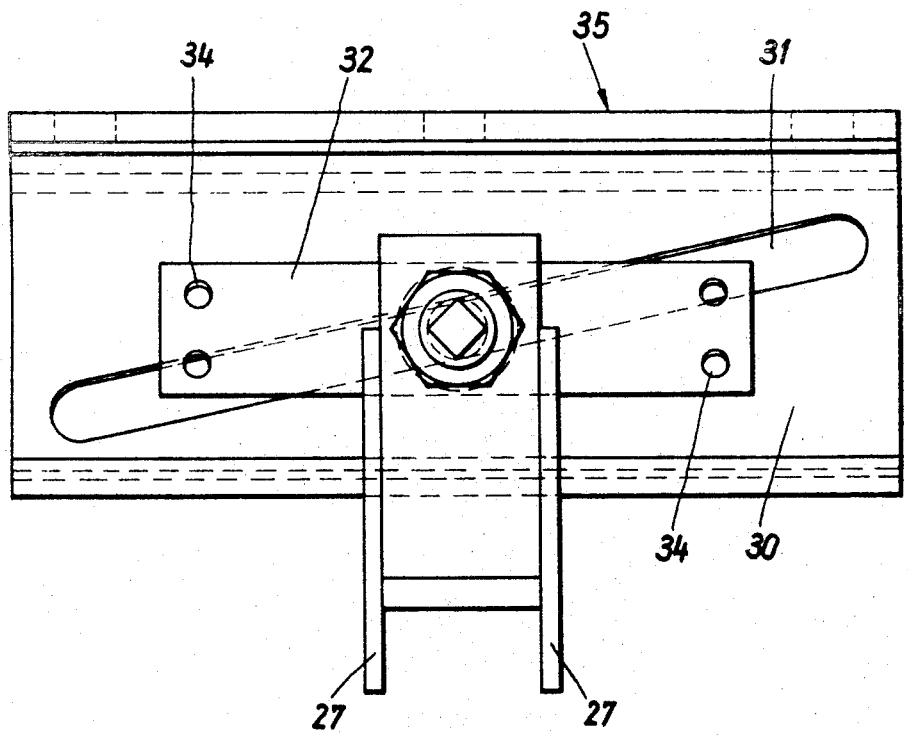
FIG. 5 is a top-plan view of the embodiment shown in FIG. 4.

Coming now to the embodiment shown in FIGS. 4 and 5, it will be noted that this differs from that shown in FIG. 2 in that the angle bracket 26, which is to be secured to the movable face plate 2, actually consists of an angle 28 which is reinforced with one or more ribs 27. A sleeve 29 extends through one arm of the angle bracket 28 and is provided with an internal screw thread. The sleeve 29 is, as clearly illustrated in FIG. 4, welded or otherwise rigidly secured to the arm of the angle bracket 28. The screw 7 is threaded through the sleeve 29 in meshing engagement of its external screw threads with the internal screw threads of the sleeve 29. The smooth end portion 9 of the screw 7 extends through a longitudinally extending slot 31 (see FIG. 5) which corresponds to the slot 10 shown in FIGS. 2 and 3. Unlike the embodiment of FIGS. 2 and 3, however, the intermediate member is not of a box-shaped cross-sectional configuration, but rather is provided in the form of a plate 30. The bracket which is secured to the stationary element, that is the supporting wall, is identified with reference numeral 35 in general and comprises a U-shaped projection 36 which at the upper open end thereof is provided with grooves 37, 38 in which edge portions of the plate 30 are received for sliding movement therein. FIG. 4 indicates that the plate 30 cannot be purposely or accidentally withdrawn in upward direction.

Adjustment of the angle bracket 26 relative to the angle bracket 35, that is adjustment of the plate 2 (not illustrated) relative to the wall 15 (not illustrated) is accomplished by either moving the plate 30 in longitudinal direction of the angle bracket 35, which results in parallel displacement of the plate relative to the supporting wall if the screw 7 is simultaneously moved with the plate 30, or by moving the plate 30 only in which case the angle bracket 26 moves in the direction transversely to the surface to which the angle bracket 35 is secured. If simultaneous movement of plate 30 and screw 7 is desired, it can be advantageous to provide a stop member 32 which is provided with a bore 33 through which the end portion 9 of the screw 7 extends. The bore 33 is of course aligned with the slot 31 in the plate 30. Additional bores 34 may be provided in the stop member 32 so that the latter can be secured, as by means of screws or bolts, to the plate 30 to prevent movement of the screw 7 relative to the latter.

Figure 6:
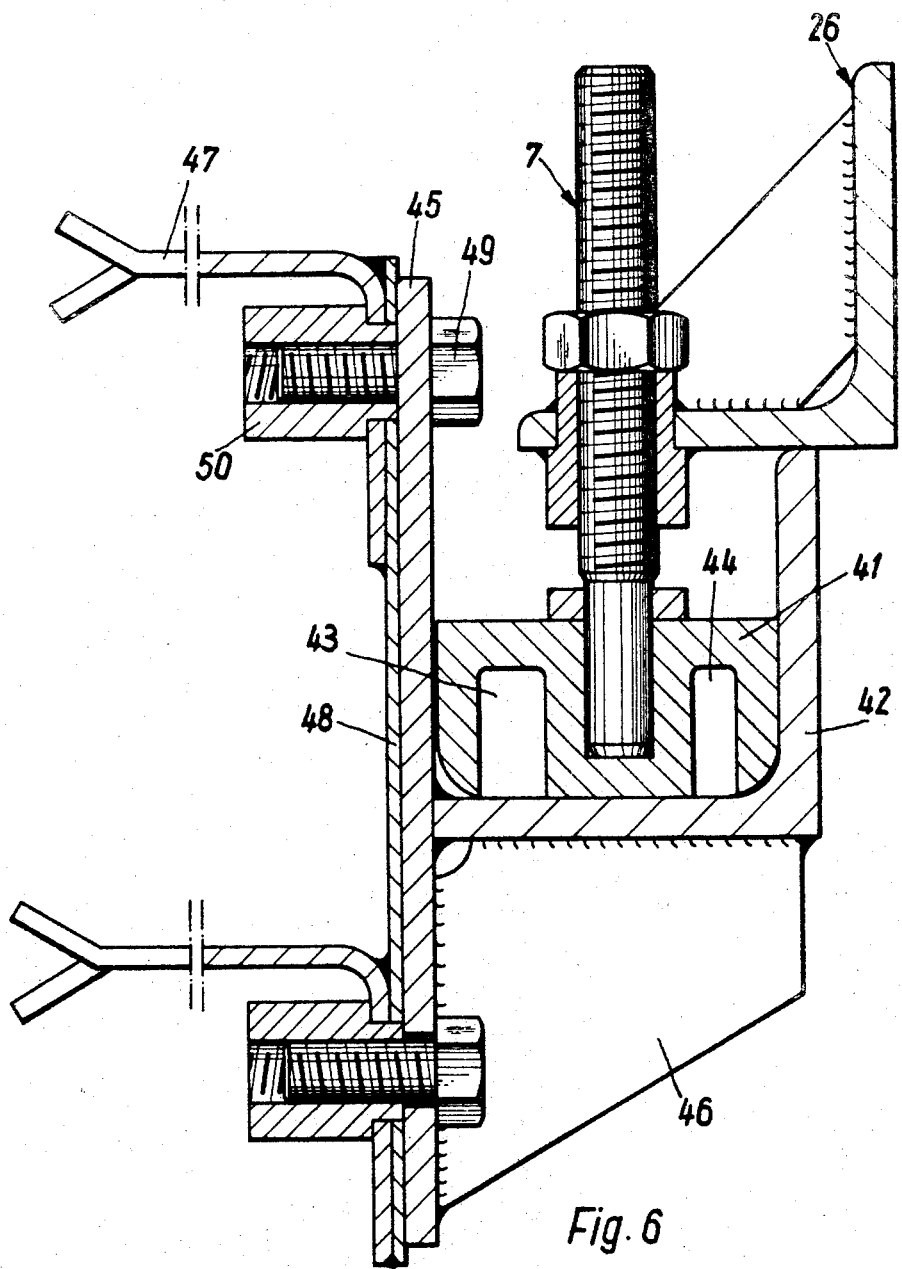
FIG. 6 is a sectional elevation of yet a further embodiment of my novel connecting arrangement.
Figure 7:
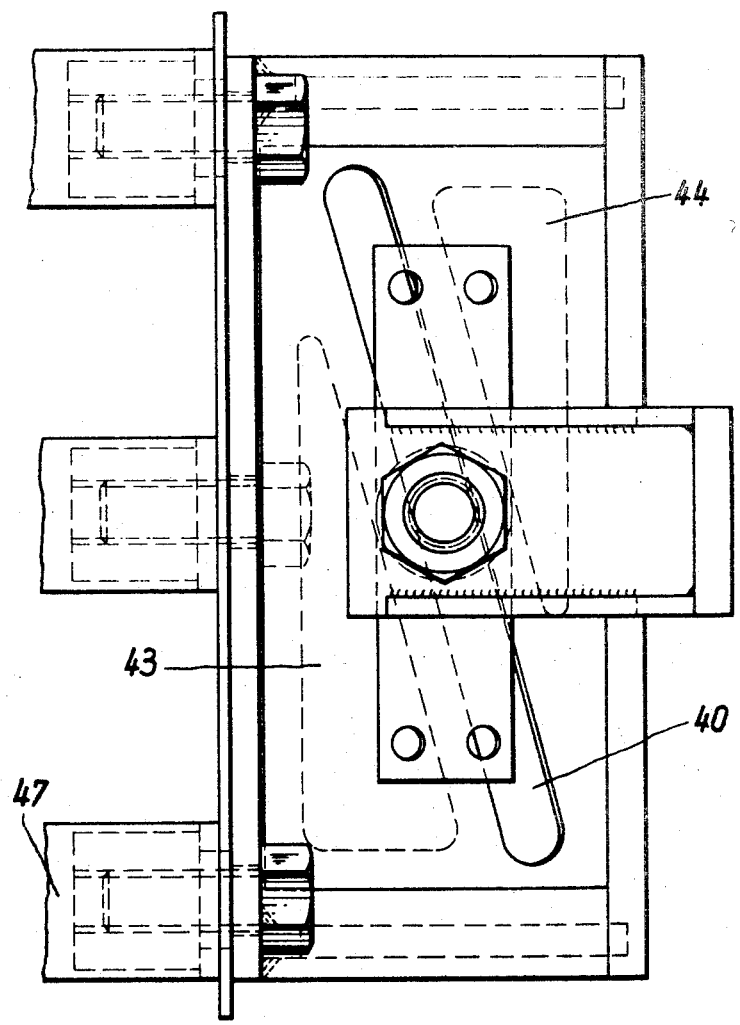
FIG. 7 is a top-plan view of the embodiment shown in FIG. 6.

Coming now to the embodiment shown in FIGS. 6 and 7 it will be noted that this differs from the previous embodiment primarily in that the box-shaped cross section of the member 8, and the plate-like configuraton of the member 30 has been replaced by a—preferably cast—member 41. This member 41 is slidably arranged in an angle member 42 and, to reduce the weight of member 41, the same is provided with hollows 43, 44. Angle 42 is secured to a plate member 45, for instance by being welded thereto as shown in FIG. 6, and the member 42 is further provided with one or more ribs 46 to reinforce it. The plate 45, on the other hand, is provided with wall anchors 47 which of course are spaced from one another, as shown in FIG. 6. The wall anchors 47 are advantageously secured as by welding to a supporting plate 48 which in turn is connected with the plate 45 via the internally screw-threaded sleeve 50 and the screws 49.

Coming, finally, to the embodiment shown in FIG. 8 it will be seen that this is intended for application where a frame, for instance a metal frame 51, is to be secured to a wall or other support member 58. In the illustrated embodiment the frame 51 is provided with a base-plate portion 52, and with elongated projections 53 and 54 which extends towards the interior of the frame 51. Arranged between the projections 53 and 54 is adjustment plate 55 so that it can slide in the space between the projections 53 and 54 and the plate 55 is provided with a longitudinally extending slot 56 which is inclined with respect to the projections 53 and 54 or, more particularly, with respect to the longitudinal extension of these projections. A screw 57 extends through the slot 56 in plate 55 and is secured in an anchoring member 59, which may be of wood, plastic or other suitable material, which is embedded in the wall or support structure 58. The base-plate portion 52 itself is provided with a relatively large-dimensioned recess 60 so that, if the plate 55 is moved in horizontal direction, that is in the longitudinal direction of the projections 53 and 54 intermediate the same, the frame 51 moves in the direction transversely of these projections 53 and 54. The height of the frame 51, that is the vertical spacing thereof from the supporting structure 58, is adjustable by means of the wedge-shaped members 61 and 62 whose shifting relative to one another permits varying of the height in dependence upon the extent to which the screw 57 is threaded into the member 59.

Of course, other applications for the novel universal connecting arrangement are possible, even though they have not been specifically disclosed herein. The materials shown in the various embodiments illustrated in the drawing can be replaced with other suitable materials.

It will be understood that each of the elements described above, or two or more together, may also find a useful application in other types of connecting arrangements differing from the types described above.

While the invention has been illustrated and described as embodied in a universal connecting arrangement, not intended to be limited to the details shown, various modifications and structural changes may be made departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, such adaptations should and are intended to be comprehended within the meaning and range of equivalence of the following claims.

What is claimed as new and desired to be protected by Letters Patent is set forth in the appended claims.

I claim:

1. A universal connecting arrangement for connecting two relatively movable elements to one another, each having a surface facing a corresponding surface on the other, comprising a first connecting member connected to one of said elements; a second connecting member connected to the other of said elements; an adjustable third connecting member connected to said first connecting member for movement in a first direction in parallelism with the general plane of at least one of said surfaces; and an adjustable fourth connecting member connected to said adjustable third connecting member for movement in a second direction transversely of said first direction and connected to said second connecting member for movement in a third direction in parallelism with said general plane of said one surface but normal to said first direction.

2. An arrangement as defined in claim 1, wherein said first and second connecting members are support brackets.

3. An arrangement as defined in claim 1, including auxiliary adjusting means comprising a substantially C-shaped member arranged to surround said second member and having a pair of arms adapted to engage and bear against said first member, and screw means carried by said arms and adapted to selectively engage said second member for moving the same in said second direction.

4. An arrangement as defined in claim 1, wherein said second member is an angle bracket comprising at least one reinforcing rib and having a leg, said second member further including a sleeve rigid with said leg and having an internally screw-threaded passage constituting a recess.

5. An arrangement as defined in claim 1, wherein said first member is elongated and comprises a substantially U-shaped portion having an upwardly open side; and wherein said third member is slidably received in said substantially U-shaped portion.

6. An arrangement as defined in claim 1, wherein said first member is elongated and comprises a substantially U-shaped portion having a pair of wall portions bounding an upwardly open side, said wall portions having inner surfaces facing one another and being provided adjacent said open side with respective longitudinally extending grooves; and wherein said third member is plate-shaped and has spaced opposite edge portions received in the respective grooves so that said intermediate member is slidable therein, said third member having an elongated slot extending transversely of said edge portions.

References Cited
UNITED STATES PATENTS

| | | | |
|---|---|---|---|
| 2,304,333 | 12/1942 | Bossi | 52—562 X |
| 2,877,875 | 3/1959 | Bolt | 52—122 X |
| 2,914,829 | 12/1959 | Willemain. | |
| 3,312,021 | 4/1967 | Rolland | 52—122 |
| 3,368,313 | 2/1968 | Morgan | 52—573 X |

FOREIGN PATENTS 90,591 10/1957 Norway.

FRANK L. ABBOTT, Primary Examiner

PRICE C. FAW, Jr., Assistant Examiner

U.S. Cl. X.R.

52—122, 235, 345